US012726555B1

(12) United States Patent
Xie et al.

(10) Patent No.: US 12,726,555 B1
(45) Date of Patent: Sep. 1, 2026

(54) ELECTRONIC DEVICE HOLDER

(71) Applicant: Shenzhen Yulianxing Technology Co., Ltd., Shenzhen (CN)

(72) Inventors: Yiji Xie, Shenzhen (CN); Yuelian Liu, Shenzhen (CN)

(73) Assignee: Shenzhen Yulianxing Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/433,353

(22) Filed: Dec. 26, 2025

(30) Foreign Application Priority Data

Apr. 25, 2025 (CN) ........................ 202520800534.6
Oct. 15, 2025 (CN) ........................ 202522181384.8
Nov. 20, 2025 (CN) ........................ 202522471357.4

(51) Int. Cl.
*H04M 1/02* (2006.01)

(52) U.S. Cl.
CPC ................................ *H04M 1/0203* (2025.01)

(58) Field of Classification Search
CPC ............................ H04M 1/0203; H04M 1/04
See application file for complete search history.

(56) References Cited

U.S. PATENT DOCUMENTS

2022/0136643 A1* 5/2022 Tian .................... F16M 13/022 294/209
2022/0381394 A1* 12/2022 Jankura ................. F16M 11/14
2023/0291822 A1* 9/2023 Liu ...................... G06F 1/1686
2024/0388318 A1* 11/2024 Kieley ................. H04B 1/3877
2025/0008012 A1* 1/2025 Liu ........................ H04M 1/04

FOREIGN PATENT DOCUMENTS

CN 111727341 A * 9/2020 .......... G03B 17/563
CN 220457459 U * 2/2024
CN 220775884 U * 4/2024
CN 222262781 U * 12/2024
DE 202023107274 U1 * 1/2024 .......... F16M 11/041
WO WO-2016133268 A1 * 8/2016 .......... H05K 5/0204

* cited by examiner

*Primary Examiner* — Curtis A Kuntz

(57) ABSTRACT

An electronic device holder includes a first pivot shaft, a supporting portion, a connecting portion, and a fixing portion. A first end of the connecting portion is rotatably connected to the supporting portion via the first pivot shaft. A second end of the connecting portion is rotatably connected to the fixing portion. A fixing mechanism configured for fixing an electronic device is arranged on the fixing portion. The fixing portion is capable of rotating circumferentially relative to the connecting portion. A rotational axis between the supporting portion and the connecting portion is a first axis, and a rotational axis between the connecting portion and the fixing portion is a second axis. The first axis is perpendicular to the second axis.

19 Claims, 10 Drawing Sheets

ELECTRONIC DEVICE HOLDER

CROSS-REFERENCE TO RELATED APPLICATIONS

The application claims priority of Chinese patent application CN2025208005346, filed on 2025 Apr. 25, CN2025221813848, filed on 2025 Oct. 15, CN2025224713574, filed on 2025 Nov. 20, disclosure of which is incorporated herein by reference in its entirety.

TECHNICAL FIELD

The present disclosure relates to the technical field of holders, in particular to an electronic device holder.

BACKGROUND

With the proliferation of electronic devices such as mobile phones and tablet computers, holders for supporting these electronic devices have been widely used. Existing electronic device holders typically employ a single-axis rotation mechanism, which only allows for adjustment in a single direction, thereby restricting the range of angle adjustment for the electronic device. Furthermore, although some holders adopt a multi-axis structure, their respective rotational axes are arranged in parallel, which still fails to achieve omnidirectional angle adjustment.

SUMMARY

The main purpose of the present disclosure is to provide an electronic device holder, aiming to enhance the portability of the electronic device holder.

In order to achieve the above purpose, the present disclosure provides the electronic device holder.

The electronic device holder includes a first pivot shaft, a supporting portion, a connecting portion, and a fixing portion.

A first end of the connecting portion is rotatably connected to the supporting portion via the first pivot shaft. The connecting portion is arranged to extend along a lengthwise direction of the supporting portion.

The fixing portion is rotatably connected to a second end of the connecting portion. A fixing mechanism configured for fixing an electronic device is arranged on the fixing portion.

A rotational axis between the supporting portion and the connecting portion is a first axis, and a rotational axis between the connecting portion and the fixing portion is a second axis. The first axis is perpendicular to the second axis.

In the technical solution of the present disclosure, the first axis formed between the supporting portion and the connecting portion is perpendicular to the second axis formed between the connecting portion and the fixing portion. This enables the fixing portion to pivot independently about two orthogonal spatial axes. Therefore, a range of angle adjustment is extended from the planar and single-axis rotation to a spherical adjustment range within a three-dimensional space. This can meet the demand for precise angle adjustment of the electronic device in scenarios such as video recording, online meetings, and movie viewing. Moreover, compared with a ball-head type universal structure, in the present technical solution, the first rotating shaft is designed to cooperate with a mounting hole to achieve rotation. This design provides a well-defined transmission path and a relatively large contact area, thereby effectively enhancing load-bearing stability and resistance to looseness.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
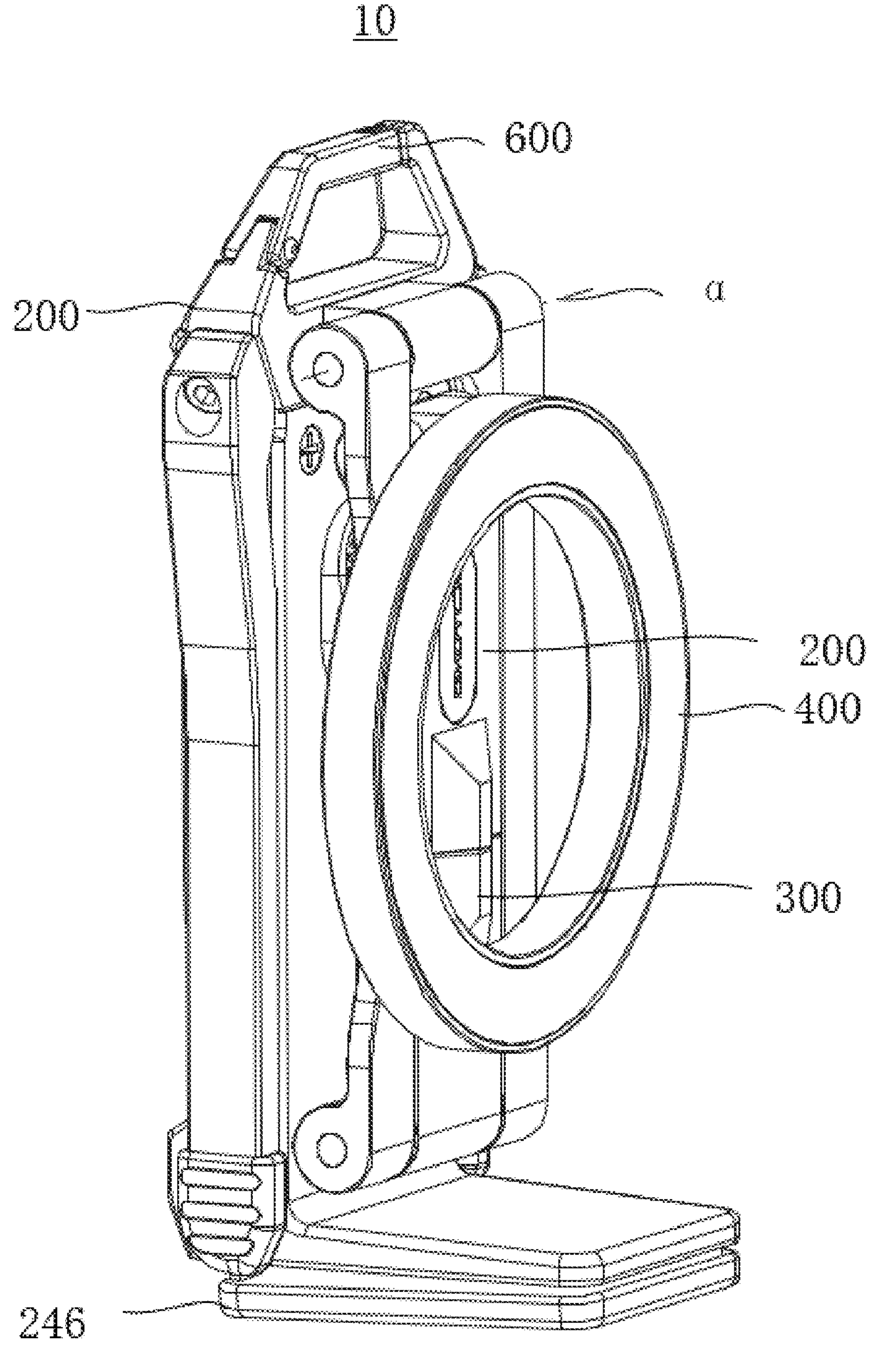
FIG. 1 is a structural diagram of an electronic device holder in one embodiment of the present disclosure.
Figure 2:
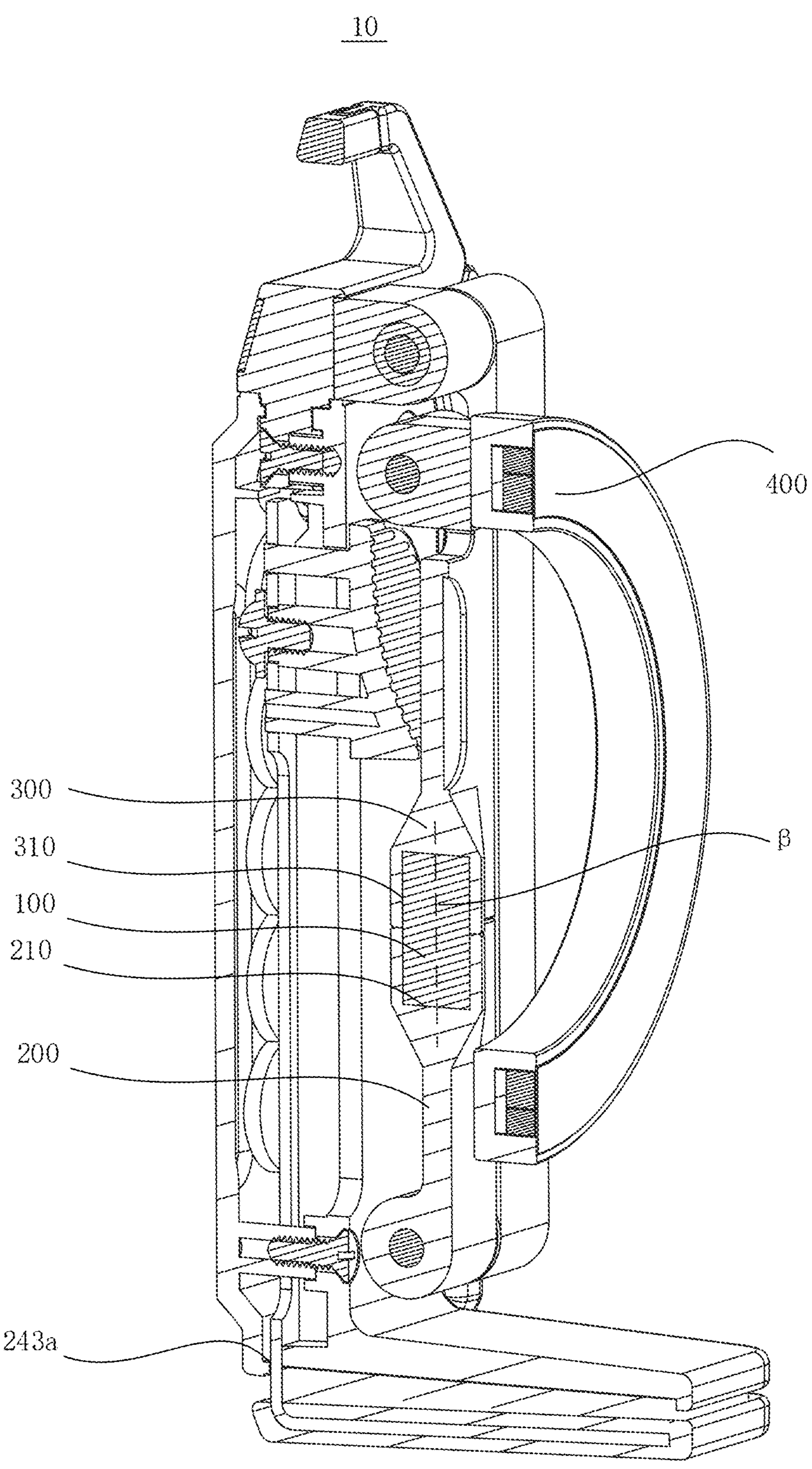
FIG. 2 is a sectional view of the electronic device holder in one embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Referring to FIG. 1-FIG. 9, the present disclosure provides an electronic device holder 10. The electronic device holder 10 includes a first pivot shaft 100, a supporting portion 200, a connecting portion 300, and a fixing portion 400. A first end of the connecting portion 300 is rotatably connected to the supporting portion 200 via the first pivot shaft 100. The connecting portion 300 is arranged to extend along a lengthwise direction of the supporting portion 200. A second end of the connecting portion 300 is rotatably connected to the fixing portion 400. A fixing mechanism 410 configured for fixing an electronic device is arranged on the fixing portion 400. The fixing mechanism 410 includes a second magnetic attraction member 411 arranged on the fixing portion 400. The second magnetic attraction member 411 is configured for magnetically attracting an electronic device.

The fixing portion 400 is capable of rotating in a circumferential direction relative to the connecting portion 300. A rotational axis between the supporting portion 200 and the connecting portion 300 is a first axis a, and a rotational axis between the connecting portion 300 and the fixing portion 400 is a second axis B. The first axis a is perpendicular to the second axis B. This dual perpendicular rotational-axis structure enables the electronic device to achieve multi-angle adjustment within a three-dimensional space, so as to satisfy the requirements for diverse usage scenarios.

Figure 5:
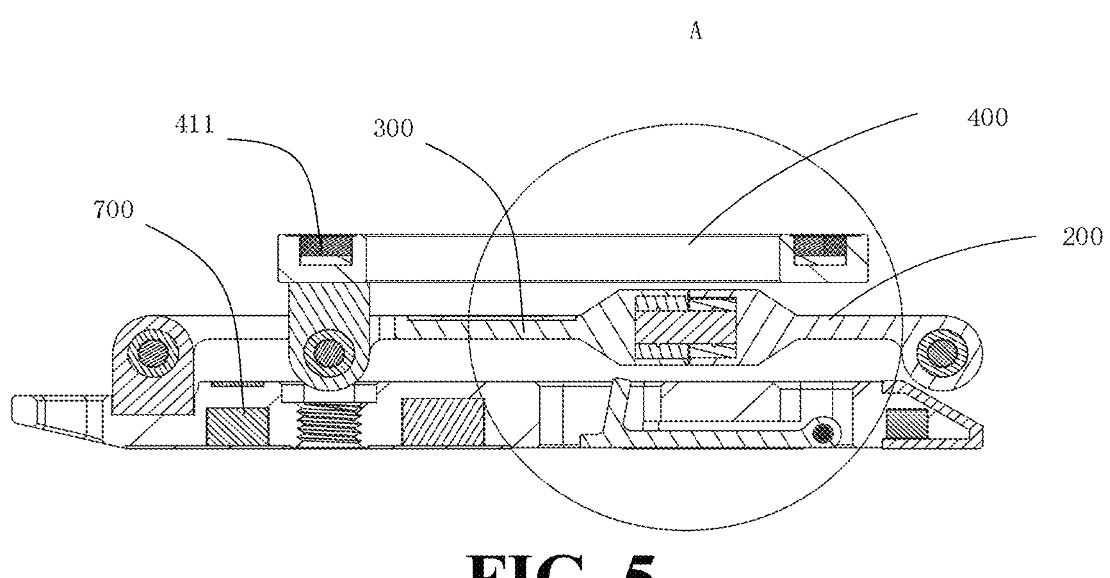
FIG. 5 is another sectional view of the electronic device holder in one embodiment of the present disclosure.
Figure 6:
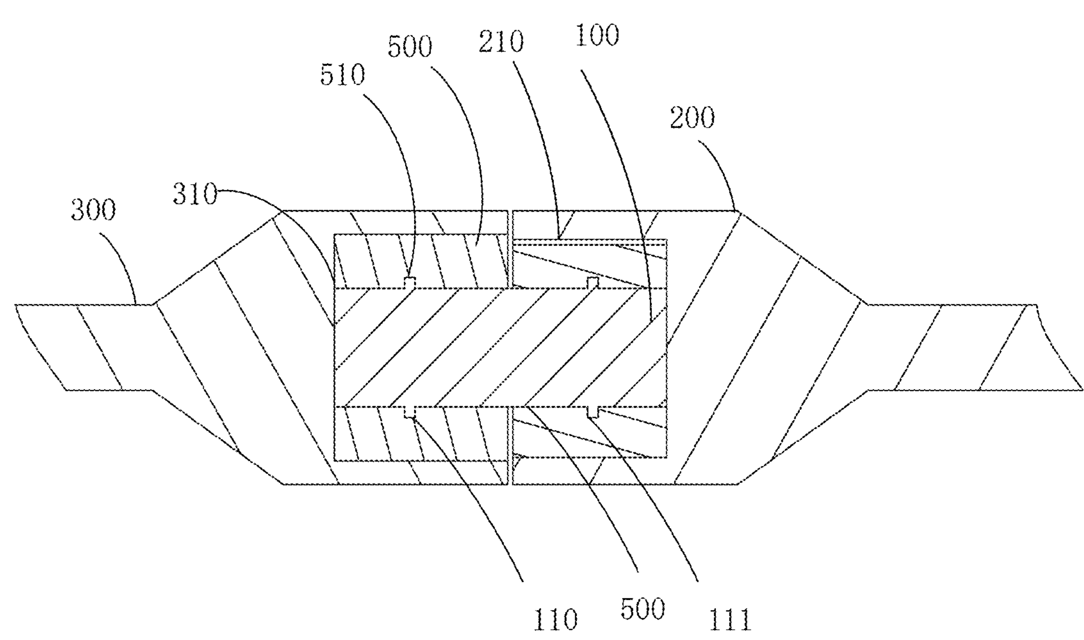
FIG. 6 is an enlarged view of area A in FIG. 5.

Referring to FIG. 5 and FIG. 6, a limiting structure 110 is arranged on the first pivot shaft 100, and the limiting structure 110 is configured for preventing the first pivot shaft 100 from moving along an axial direction. Specifically, a first pivot mounting hole 210 is defined in one end of the supporting portion 200 opposite to the connecting portion 300. A second pivot mounting hole 310 is defined in one end of the connecting portion 300 away from the fixing portion 400. Both ends of the first pivot shaft 100 are respectively positioned in the first pivot mounting hole 210 and the second pivot mounting hole 310.

Shaft sleeves 500 are arranged both in the first pivot mounting hole 210 and the second pivot mounting hole 310. Both ends of the first pivot shaft 100 are respectively positioned in the two shaft sleeves 500, and both ends of the first pivot shaft 100 are rotatably connected to the two shaft sleeves 500. The limiting structure 110 includes a first limiting portion 111 arranged on the first pivot shaft 100. A first groove 510 adapted to the first limiting portion 111 is defined in an inner wall of the shaft sleeve 500. The first limiting portion 111 is configured for abutting against the first groove 510, so as to form an axial limit for the first pivot shaft 100. The first pivot shaft 100 is configured for protruding outwards to form the first limiting portion 111. An outer surface of the first limiting portion 111 is an arc-shaped surface, or a cross-section of the first limiting portion 111 is trapezoidal. This structural design ensures the limiting effect and also facilitates assembly.

Figure 4:
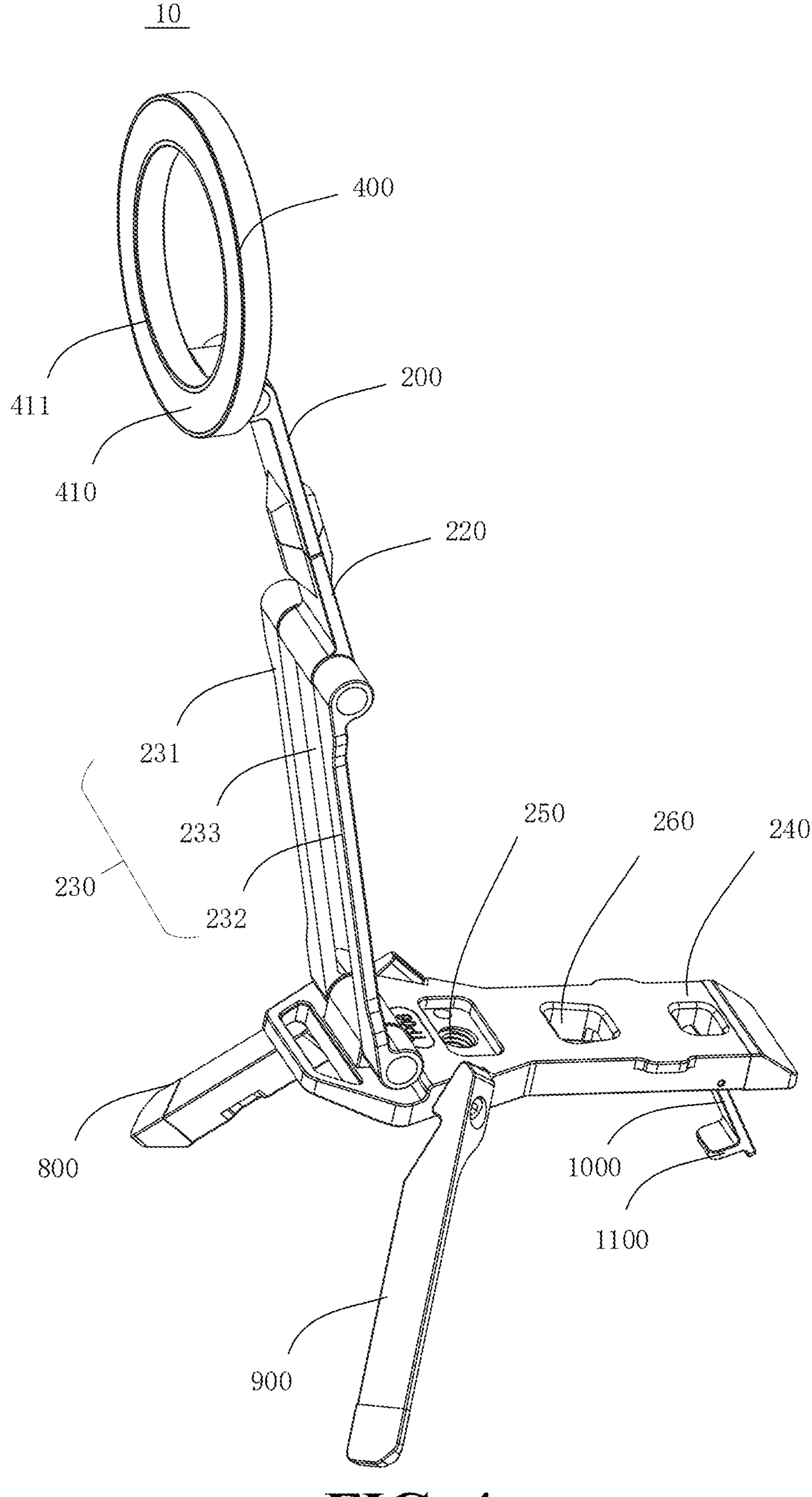
FIG. 4 is another structural diagram showing the open state of the electronic device holder of the present disclosure.

Referring to FIG. 4, a first mounting hole 250 is defined in the supporting portion 200, and the first mounting hole 250 is a threaded hole. The first mounting hole 250 is configured for connection to an external tripod. A second mounting hole 260 is defined in the supporting portion 200, and the second mounting hole 260 is configured for hanging the electronic device holder. A second mounting hole 260 is further defined in an end of the supporting portion 200 away from the connecting portion 300. The second mounting hole 260 is configured for insertion into an external support stand. These multiple external connection methods enable the holder to be adapted to different types of supporting devices, thereby improving universality of the holder.

Referring to FIG. 1-FIG. 4, the supporting portion 200 includes a first mounting portion 220, a second mounting portion 230, and a third mounting portion 240. A first end of the first mounting portion 220 is rotatably connected to the first pivot shaft 100. A second end of the first mounting portion 220 is rotatably connected to a first end of the second mounting portion 230. A second end of the second mounting portion 230 is rotatably connected to a first end of the third mounting portion 240. This three-level folding mechanism allows the holder to be folded into a compact structure, thereby facilitating portability and storage.

In one embodiment, the second mounting portion 230 includes a first rotating arm 231 and a second rotating arm 232 that are spaced apart from each other. An accommodating groove 233 is formed between the first rotating arm 231 and the second rotating arm 232.

When the connecting portion 300 and the first mounting portion 220 are in a folded state, the accommodating groove 233 is configured for receiving the connecting portion 300 and the first mounting portion 220. A first end of the first rotating arm 231 and a first end of the second rotating arm 232 are hinged to the first mounting portion 220. A second end of the first rotating arm 231 and a second end of the second rotating arm 232 are hinged to the third mounting portion 240. This structural design enables the holder in its folded state to achieve a smaller volume and present a neater appearance.

Figure 7:
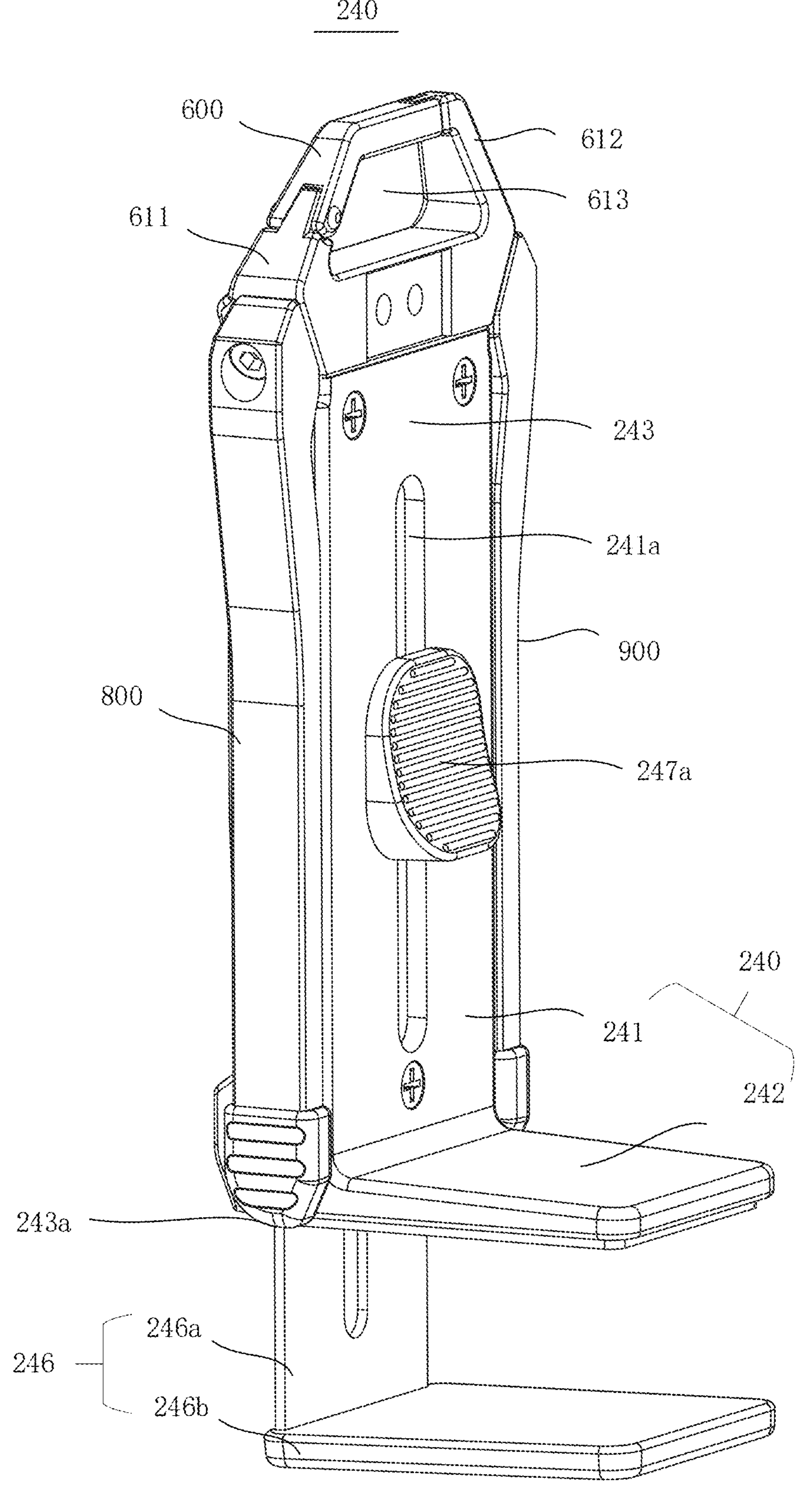
FIG. 7 is a structural diagram of a supporting portion of the present disclosure.
Figure 8:
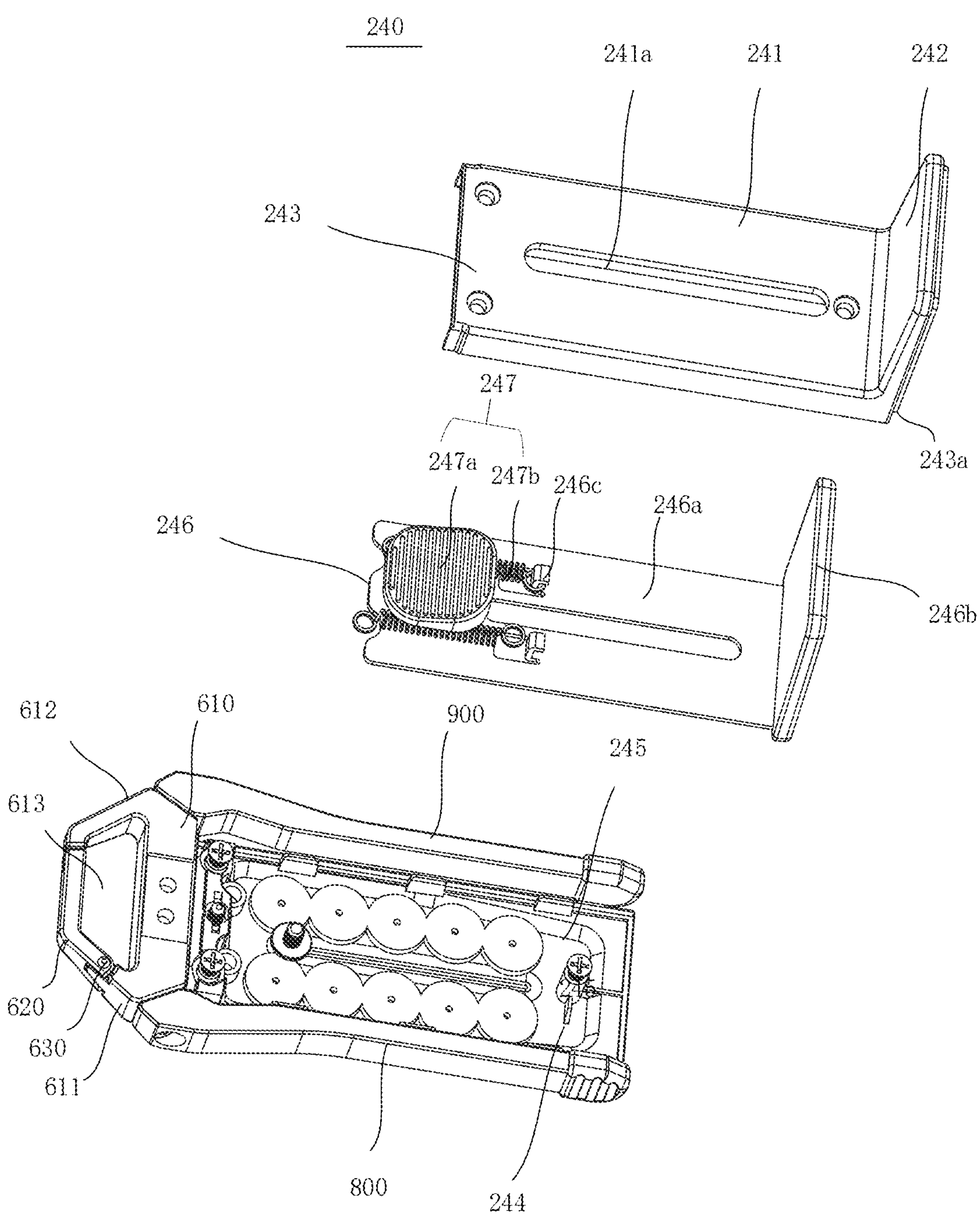
FIG. 8 is an exploded view of the supporting portion of the present disclosure.
Figure 9:
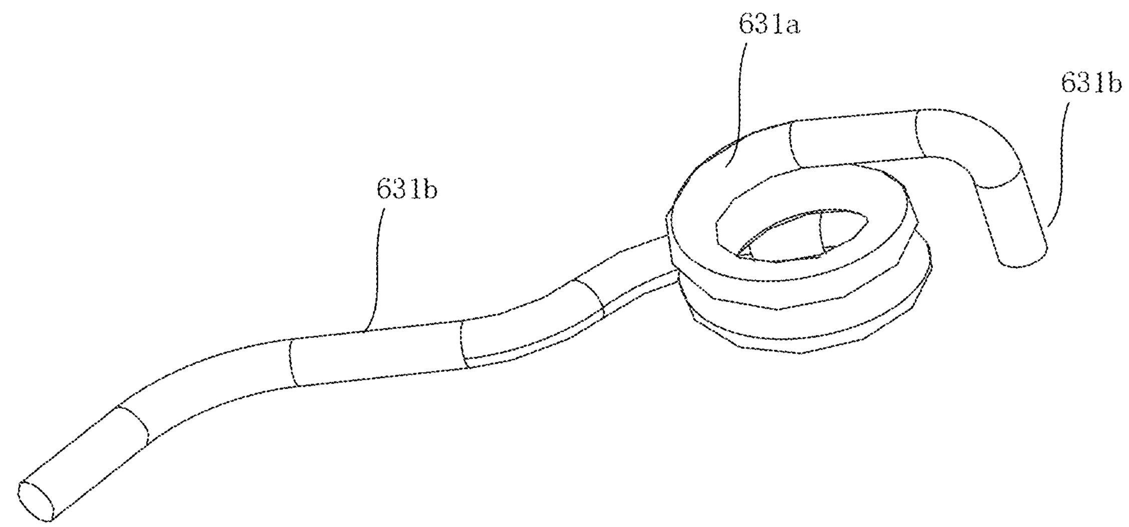
FIG. 9 is a structural diagram of a first elastic restoring member of the present disclosure.
Figure 10:
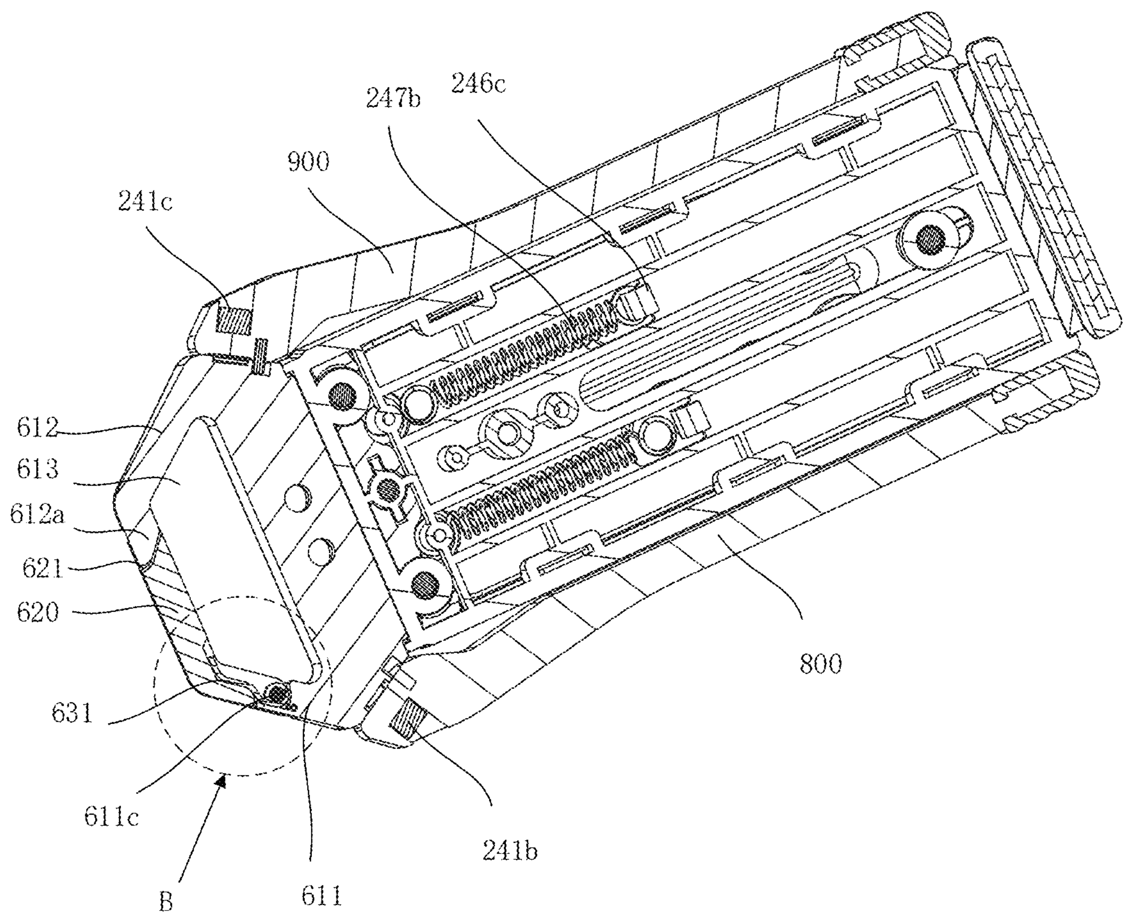
FIG. 10 is another sectional view of the electronic device holder in one embodiment of the present disclosure.
Figure 11:
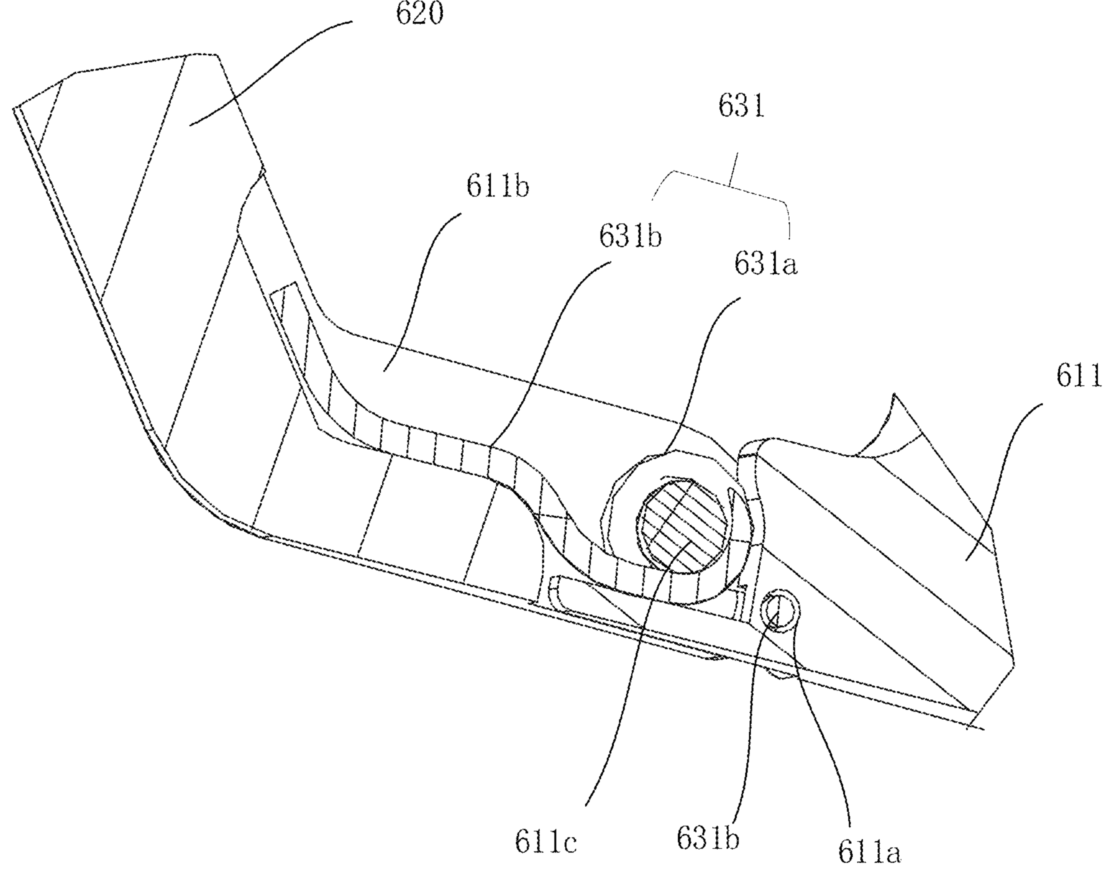
FIG. 11 is an enlarged view of area B in FIG. 10.

Referring to FIG. 7, FIG. 8, and FIG. 9, in one embodiment of the present disclosure, the electronic device holder includes a latching hook 600. The third mounting portion 240 is provided with a first extension portion 241 and a carrying portion 242. The carrying portion 242 is arranged on a first end of the first extension portion 241. The first extension portion 241 and the carrying portion 242 are configured for providing support to a mobile electronic device, so as to fix the mobile electronic device. In the present embodiment, the holder main body is L-shaped. Mobile electronic devices such as smartphones and tablets can be placed on the third mounting portion 240 at a tilt. In this state, a first end of the mobile electronic device rests against the first extension portion, and a second end of the mobile electronic device is placed on the carrying portion 242. Therefore, the mobile electronic device is secured at a suitable viewing angle, and users' hands are freed.

The latching hook 600 is arranged on a second end of the first extension portion 241. The latching hook 600 is configured for suspending the holder on other objects. In the present embodiment, by using the latching hook 600, the electronic device holder 10 can be suspended on objects such as an airplane seat, a high-speed rail seat, a luggage pull rod, or a backpack. The latching hook 600 may adopt various structures, such as a rotatable hook structure, an elastic clamping mechanism, or a magnetic attachment assembly.

Referring to FIG. 7-FIG. 11, in order to access the electronic device holder more conveniently, in one embodiment, preferably, the latching hook 600 utilizes a structure similar to a carabiner. Specifically, the latching hook 600 includes a hook body 610, a first swing arm 620, and a first elastic restoring member 630.

The hook body 610 is arranged on the second end of the first extension portion 241. A fourth mounting portion 611 and a fifth mounting portion 612 are respectively formed at both sides of the hook body 610.

A first hinge shaft 611*c* is arranged on the fourth mounting portion 611. The first swing arm 620 is hinged to the fourth mounting portion 611 via the first hinge shaft 611*c*. When the first swing arm 620 is in a first position, a movement space 613 is formed among the first swing arm 620, the fourth mounting portion 611, and the fifth mounting portion 612. It is to be noted that, referring to FIG. 8, the position of the first swing arm 620 as illustrated therein is the first position.

The first elastic restoring member 630 is arranged between the first swing arm 620 and the fourth mounting portion 611. Under an elastic force of the first elastic restoring member 630, the first swing arm 620 is capable of pivoting about the hinge shaft within the movement space 613, or returning to the first position.

In the present embodiment, both the fourth mounting portion 611 and the fifth mounting portion 612 are arranged obliquely relative to the hook body 610. In addition, the fourth mounting portion 611 is arranged opposite to the fifth mounting portion 612. When the first swing arm 620 is in the first position, a generally trapezoidal structure is enclosed and formed by the first swing arm 620, the fourth mounting portion 611, the fifth mounting portion 612, and the hook body 610. Meanwhile, the movement space 613 is formed among the first swing arm 620, the fourth mounting portion 611, and the fifth mounting portion 612. The first swing arm 620 is capable of swinging within the movement space 613, so as to open or close the latching hook 600 to suspend the electronic device holder on other objects. It is to be noted that when the first swing arm 620 is in the first position, the latching hook 600 is in a closed state.

Referring to FIG. 8-FIG. 11, in one embodiment, the first elastic restoring member 630 is a torsion spring 631. The torsion spring 631 includes a coil 631*a* and two elastic rods 631*b*, and the two elastic rods 631*b* extend from two ends of the coil 631*a*. The coil 631*a* is sleeved on the first hinge shaft. The two elastic rods 631*b* are configured for respectively abutting against the first swing arm 620 and the fourth mounting portion 611.

In the present embodiment, a third mounting hole 611*a* and a mounting groove 611*b* are defined in the first mounting portion 611. The mounting groove 611*b* is designed to match a shape of the elastic rod 631*b*. A limiting portion 612*a* is arranged on an end portion of the fifth mounting portion 612. A limiting groove 621 is defined in an end of the first swing arm 620 opposite to the fifth mounting portion 612. One elastic rod 631*b* is configured for abutting against the mounting groove 611*b*. The other elastic rod 631*b* is inserted into the third mounting hole 611*a* and is configured for abutting against the third mounting hole 611*a*. Without an external force, the first swing arm 620 is maintained in the first position by the elastic force generated by the torsion spring 631, and the latching hook 600 remains normally in the closed state. The limiting portion 612*a* is engaged with the limiting groove 621, so as to realize a limiting function of the fifth mounting portion 612 on the first swing arm 620. Therefore, the first swing arm 620 can only rotate towards an inner side of the fifth mounting portion 612. In other words, the first swing arm 620 is capable of swinging within the movement space 613.

In travel scenarios, whether on high-speed trains, airplanes, or buses, jolts and vibrations from the vehicle are common. In the prior art, the holder is simply placed on a table or similar surfaces, so that the device is prone to slipping.

In order to maintain a stable viewing angle for a screen of the electronic device, and to prevent the device from slipping off due to vehicle vibrations, referring to FIG. 7-FIG. 9, in one embodiment, the third mounting portion 240 includes a front housing 243, a rear housing 244, a clamping member 246, and a second elastic restoring member 247.

The first extension portion 241 and the carrying portion 242 are formed on the front housing 243. The rear housing 244 is detachably connected to the front housing 243, and a receiving space 245 is formed between the rear housing 244 and the front housing 243. The hook body 610 is arranged on the rear housing 244. The clamping member 246 includes a second extension portion 246*a* and a clamping portion 246*b*. The second extension portion 246*a* is movably arranged in the receiving space 245. An avoidance recess 243*a* is defined in the front housing 243, and at least one portion of the second extension portion 246*a* extends out from the avoidance recess 243*a*. The clamping portion 246*b* is arranged opposite to the carrying portion 242. In addition, the clamping portion 246*b* is configured for cooperating with the carrying portion 242, so as to clamp the holder on the plate-like object.

The second elastic restoring member 247 is arranged in the receiving space 245. A first end of the second elastic restoring member 247 is connected to the rear housing 244. A second end of the second elastic restoring member 247 is connected to the second extension portion 246*a*.

In the present embodiment, the second elastic restoring member 247 is configured for providing an elastic force. The clamping portion 246*b* is configured for abutting against the carrying portion 242 under the action of elastic force. During use, the clamping member 246 is pulled out, causing the second elastic restoring member 247 to be stretched. Further, a gap is formed between the clamping portion 246*b* and the carrying portion 242. After that, a plate-like object can be inserted into the gap. The elastic force generated by the contraction of the second elastic restoring member 247 serves as a clamping force between the clamping portion 246*b* and the carrying portion 242, so as to clamp the holder onto the plate-like object.

Referring to FIG. 7 and FIG. 8, in one embodiment, specifically, the second elastic restoring member 247 includes a button 247*a* and a spring 247*b*.

A sliding slot 241*a* is defined in the first extension portion 241. The button 247*a* is arranged on the second extension portion 246*a*. In addition, the button 247*a* is slidably connected to the sliding slot 241*a*.

A retaining clip 246*c* is arranged on the fourth extension portion. A first end of the spring 247*b* is connected to the retaining clip 246*c*, and a second end of the spring 247*b* is connected to the rear housing 244.

In order to mount the holder on a metal plate, in one embodiment, a permanent magnet is arranged on the first extension portion 241.

Figure 3:
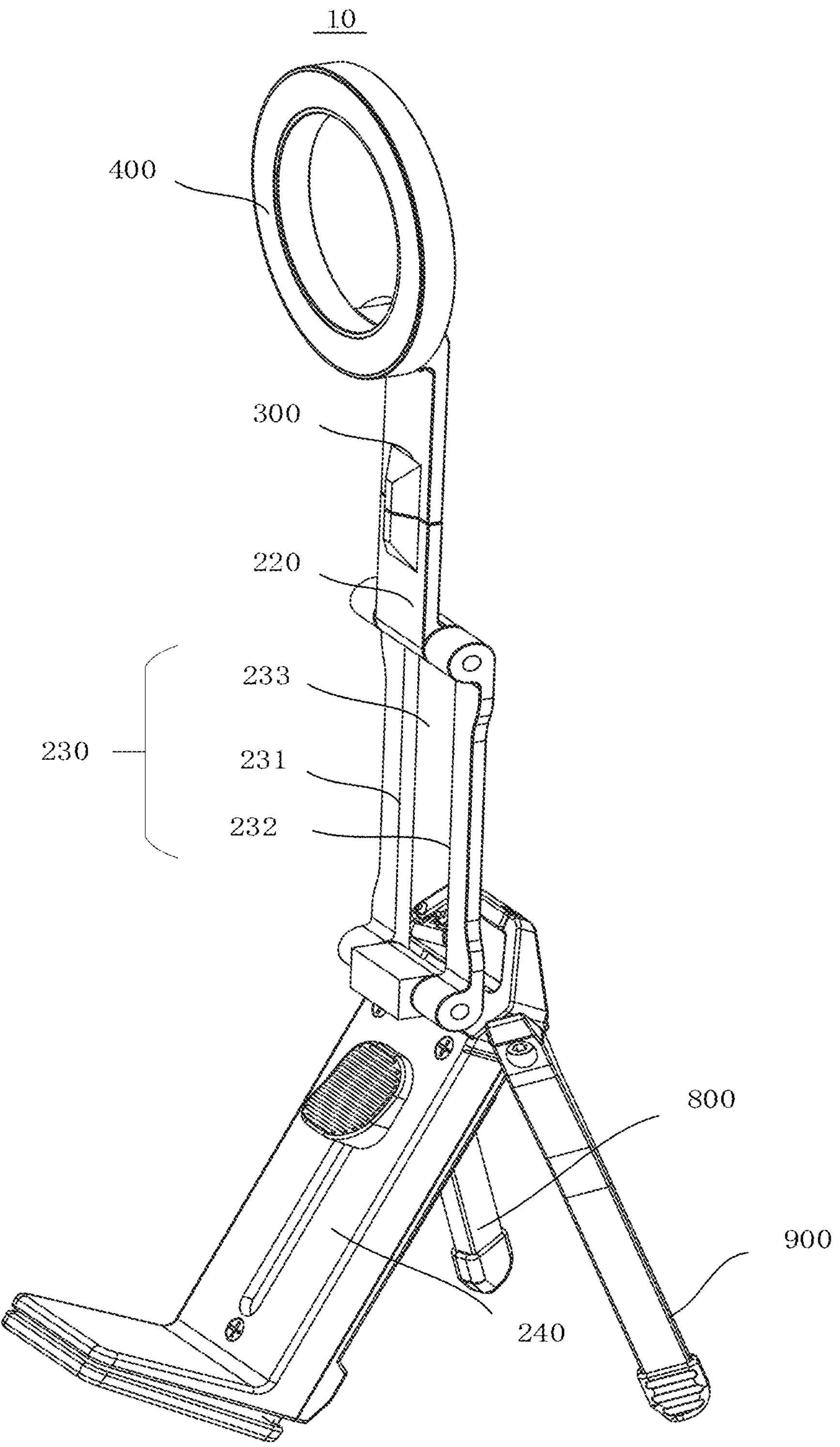
FIG. 3 is a structural diagram showing an open state of the electronic device holder of the present disclosure.

Referring to FIG. 3-FIG. 4, in order to improve the stability of supporting legs, in one embodiment, the electronic device holder includes a first supporting leg 800 and a second supporting leg 900.

A first side of the second end of the first extension portion 241 is provided with a second hinge shaft 241*b*. The first supporting leg 800 is hinged to the first side of the first extension portion 241 via the second hinge shaft 241*b*.

A second side of the second end of the first extension portion 241 is provided with a third hinge shaft 241*c*. The second supporting leg 900 is hinged to the second side of the first extension portion 241 via the third hinge shaft 241*c*.

In the present embodiment, when the first supporting leg 800 and the second supporting leg 900 are unfolded, a tripod support structure is formed. This tripod support structure can significantly enhance the placement stability of the holder. Particularly when placed on uneven surfaces, the tripod support structure can effectively prevent the holder from tipping over. The first supporting leg 800 and the second supporting leg 900 are pivotally connected to the first extension portion 241, thereby allowing users to conveniently unfold or fold the supporting legs as needed. When needed, users simply need to unfold the legs to form a stable supporting structure. When not in use, the legs can be easily folded for convenient portability and storage.

In the present embodiment, by arranging the first extension portion 241 and the carrying portion 242 on the third mounting portion 240, the first extension portion 241 and the carrying portion 242 are configured for providing support to the mobile electronic device, so as to fix the mobile electronic device. Moreover, the latching hook 600 is arranged on one end of the first extension portion 241 away from the carrying portion 242. By arranging the latching hook 600, the holder can be suspended on other objects. This enhances portability, allows for convenient access by users, and thereby improves the case of use of the holder.

The mobile phone holder further includes a retaining portion 1000. A first end of the retaining portion 1000 is rotatably connected to the supporting portion 200, and a free end of the retaining portion 1000 is provided with a second limiting portion 1100. The hook-shaped structure of the retaining portion is used to engage with a suspension surface. When it is required to hang and fix the device on a vertical or inclined supporting surface, users can rotate the retaining portion 1000 from a stored state to an operational state, so that the retaining portion 1000 forms an angle ranging from 40 degrees to 160 degrees with the supporting portion 200. In this state, a hook-shaped opening of the second limiting portion 1100 is oriented opposite to the supporting portion 200, so that the second limiting portion 1100 is in a state ready for hanging engagement.

During use, users can align the hook-shaped opening of the second limiting portion 1100 with and engage it onto an edge of a target suspension surface. Through a vertically downward movement, an inner surface of the hook-shaped opening is interlocked with the edge of the suspension surface. This hook-shaped structure utilizes a bent geometric form of the second limiting portion 1100 to create a mechanical locking effect, thereby forming a secure engagement between the device and the suspension surface. The weight of the device is transmitted to the edge of the suspension surface via the retaining portion 1000 and a hook engagement surface of the second limiting portion 1100. In addition, the suspension surface correspondingly generates an upward support reaction force. Therefore, a state of force equilibrium is reached, so that the entire device is stably suspended on a vertical or inclined supporting surface.

In this hanging engagement state, the fixing portion 400 and the mobile phone secured by the fixing portion are in a suspended state. The supporting legs may remain in the stored state or may be unfolded as needed to enhance overall stability. This hanging mode is particularly suitable for application scenarios where the mobile phone needs to be fixed on vertical supporting surfaces such as walls or partitions for video recording, video calls, or content viewing. This eliminates the need for occupying a desk space or holding the device on hand, so as to enable stable image capture and output.

The rotatably adjustable retaining portion 1000 allows users to flexibly adjust its angle relative to the supporting portion 200 based on actual conditions of the suspension surface. This ensures that the hook-shaped opening of the second limiting portion 1100 can accurately engage with the target edge. In addition, this angle adjustment can change the inclined orientation of the device after it is hung. Therefore, this allows users to optimize the spatial orientation of the fixing portion 400 and the mobile phone mounted thereon, so as to achieve an optimal viewing effect.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

The invention claimed is:

1. An electronic device holder, comprising:

a first pivot shaft;

a supporting portion;

a connecting portion, a first end of the connecting portion being rotatably connected to the supporting portion via the first pivot shaft, and the connecting portion being arranged to extend along a lengthwise direction of the supporting portion;

a fixing portion, wherein the fixing portion is rotatably connected to a second end of the connecting portion, and the fixing portion comprises a fixing mechanism configured for fixing an electronic device;

wherein a rotational axis between the supporting portion and the connecting portion is a first axis, a rotational axis between the connecting portion and the fixing portion is a second axis, and the first axis is perpendicular to the second axis;

wherein the electronic device holder further comprises a limiting structure arranged on the first pivot shaft, wherein the limiting structure is configured for preventing the first pivot shaft from moving along an axial direction;

wherein a first pivot mounting hole is defined in one end of the supporting portion opposite to the connecting portion;

a second pivot mounting hole is defined in one end of the connecting portion away from the fixing portion, and both ends of the first pivot shaft are respectively positioned in the first pivot mounting hole and the second pivot mounting hole.

2. The electronic device holder according to claim 1, wherein shaft sleeves are arranged both in the first pivot mounting hole and the second pivot mounting hole, both ends of the first pivot shaft are respectively positioned in the two shaft sleeves, and both ends of the first pivot shaft are rotatably connected to the two shaft sleeves.

3. The electronic device holder according to claim 2, wherein the limiting structure comprises a first limiting portion arranged on the first pivot shaft, a first groove adapted to the first limiting portion is defined in an inner wall of the shaft sleeve, and the first limiting portion is configured for abutting against the first groove, so as to form an axial limit for the first pivot shaft.

4. The electronic device holder according to claim 3, wherein the first pivot shaft is configured for protruding outwards to form the first limiting portion, an outer surface of the first limiting portion is an arc-shaped surface, or a cross-section of the first limiting portion is trapezoidal.

5. The electronic device holder according to claim 1, wherein the holder further comprises a retaining portion, a first end of the retaining portion is rotatably connected to the supporting portion, and the retaining portion is capable of rotating relative to the supporting portion, so as to switch to a stored state or an operational state;

a second end of the retaining portion is provided with a second limiting portion, and the second limiting portion is configured to hook onto an edge of an external object during the operational state, so as to fix the electronic device holder.

6. The electronic device holder according to claim 1, wherein a first mounting hole is defined in the supporting portion, the first mounting hole is a threaded hole, and the first mounting hole is configured for connection to an external tripod.

7. The electronic device holder according to claim 6, wherein a second mounting hole is defined in the supporting portion, and the second mounting hole is configured for hanging the electronic device holder.

8. An electronic device holder, comprising:

a first pivot shaft;

a supporting portion;

a connecting portion, a first end of the connecting portion being rotatably connected to the supporting portion via the first pivot shaft, and the connecting portion being arranged to extend along a lengthwise direction of the supporting portion;

a fixing portion, wherein the fixing portion is rotatably connected to a second end of the connecting portion, and the fixing portion comprises a fixing mechanism configured for fixing an electronic device;

wherein a rotational axis between the supporting portion and the connecting portion is a first axis, a rotational axis between the connecting portion and the fixing portion is a second axis, and the first axis is perpendicular to the second axis;

wherein the supporting portion comprises:

a first mounting portion, a first end of the first pivot shaft being rotatably connected to a first end of the first mounting portion, and a second end of the first pivot shaft being rotatably connected to the connecting portion;

a second mounting portion, wherein a second end of the first mounting portion is rotatably connected to a first end of the second mounting portion, and a rotational axis between the first mounting portion and the second mounting portion is parallel to the second axis.

9. The electronic device holder according to claim 8, wherein the supporting portion further comprises a third mounting portion, a second end of the second mounting portion is rotatably connected to a first end of the third mounting portion, and a rotational axis between the second mounting portion and the third mounting portion is parallel to the second axis.

10. The electronic device holder according to claim 9, wherein the second mounting portion comprises a first rotating arm and a second rotating arm spaced apart from each other, an accommodating groove is formed between the first rotating arm and the second rotating arm, and when the connecting portion and the first mounting portion are in a folded state, the accommodating groove is configured for receiving the connecting portion and the first mounting portion;

a first end of the first rotating arm and a first end of the second rotating arm are hinged to the first mounting portion, and a second end of the first rotating arm and a second end of the second rotating arm are hinged to the third mounting portion.

11. The electronic device holder according to claim 9, wherein the holder comprises a latching hook, the latching hook is arranged on the first end of the third mounting portion, and the latching hook is configured for suspending the holder on other objects.

12. The electronic device holder according to claim 11, the latching hook comprising:

a hook body, the hook body being arranged on a second end of the third mounting portion, both sides of the hook body being respectively provided with a fourth mounting portion and a fifth mounting portion, and the fourth mounting portion being arranged opposite to the fifth mounting portion;

a swing arm, a first hinge shaft being arranged on the fourth mounting portion, the swing arm being hinged to the fourth mounting portion via the first hinge shaft, and when the swing arm being in a first position, a movement space being formed among the swing arm, the fourth mounting portion, and the fifth mounting portion;

a first elastic restoring member, wherein the first elastic restoring member is arranged between the swing arm and the fourth mounting portion, and the swing arm is configured for returning to the first position under an elastic force of the first elastic restoring member.

13. The electronic device holder according to claim 12, wherein the first elastic restoring member is a torsion spring, the torsion spring comprises a coil and two elastic rods, and the two elastic rods respectively extend from two ends of the coil; the coil is sleeved on the first hinge shaft, and the two elastic rods are configured for respectively abutting against the swing arm and the fourth mounting portion.

14. The electronic device holder according to claim 9, the third mounting portion comprising:

a front housing, a first extension portion and a carrying portion being formed on the front housing;

a rear housing, the rear housing being connected to the front housing to form a receiving space;

a clamping member, the clamping member comprising a second extension portion and a clamping portion, the clamping portion being arranged opposite to the carrying portion, and the clamping portion being configured for cooperating with the carrying portion to clamp the holder onto a plate-like object;

a second elastic restoring member, wherein the second elastic restoring member is arranged in the receiving space, a first end of the second elastic restoring member is connected to the rear housing or the front housing, and a second end of the second elastic restoring member is connected to the second extension portion.

15. The electronic device holder according to claim 14, wherein the second extension portion is movably arranged in the receiving space, an avoidance recess is defined in the front housing, and at least one portion of the second extension portion extends out from the avoidance recess;

the second elastic restoring member, comprising:

a button, the first extension portion comprising a sliding slot, the button being arranged on the second extension portion, and the button being slidably connected to the sliding slot;

a spring, wherein a retaining clip is arranged on the second extension portion, a first end of the spring is connected to the retaining clip, and a second end of the spring is connected to the rear housing.

16. The electronic device holder according to claim 9, wherein a first magnetic attraction member is arranged on the third supporting portion, and the first magnetic attraction member is configured for magnetically attracting a metal surface, thus achieving the fixation of the electronic device holder.

17. The electronic device holder according to claim 16, wherein the fixing mechanism comprises a second magnetic attraction member arranged on the fixing portion, and the second magnetic attraction member is configured for magnetically attracting an electronic device.

18. The electronic device holder according to claim 9, comprising:

a first supporting leg, a first side of a first end of the third mounting portion comprising a second hinge shaft, and the first supporting leg being hinged to the third mounting portion via the second hinge shaft;

a second supporting leg, wherein a second side of the first end of the third mounting portion is provided with a third hinge shaft, and the second supporting leg is hinged to the third mounting portion via the third hinge shaft.

19. An electronic device holder, comprising:

a first pivot shaft;

a supporting portion;

a connecting portion, a first end of the connecting portion being rotatably connected to the supporting portion via the first pivot shaft, and the connecting portion being arranged to extend along a lengthwise direction of the supporting portion;

a fixing portion, wherein the fixing portion is rotatably connected to a second end of the connecting portion, and the fixing portion comprises a fixing mechanism configured for fixing an electronic device;

wherein a rotational axis between the supporting portion and the connecting portion is a first axis, a rotational axis between the connecting portion and the fixing portion is a second axis, and the first axis is perpendicular to the second axis;

wherein the supporting portion comprises:

a first mounting portion, a first end of the first pivot shaft being rotatably connected to a first end of the first mounting portion, and a second end of the first pivot shaft being rotatably connected to the connecting portion;

a second mounting portion, wherein a second end of the first mounting portion is rotatably connected to a first end of the second mounting portion, and a rotational axis between the first mounting portion and the second mounting portion is parallel to the second axis;

wherein the supporting portion further comprises a third mounting portion, a second end of the second mounting portion is rotatably connected to a first end of the third mounting portion, and a rotational axis between the second mounting portion and the third mounting portion is parallel to the second axis;

wherein a first magnetic attraction member is arranged on the third supporting portion, and the first magnetic attraction member is configured for magnetically attracting a metal surface, thus achieving the fixation of the electronic device holder.

* * * * *